US011616415B2

(12) United States Patent
Liang et al.

(10) Patent No.: US 11,616,415 B2
(45) Date of Patent: Mar. 28, 2023

(54) SYSTEM AND METHOD FOR PROVIDING DYNAMIC FORCE

(71) Applicant: Hung Chang International Energy Co., Ltd., Kaohsiung (TW)

(72) Inventors: Chin-Tsai Liang, Kaohsiung (TW); Chiung-Tan Hsu, Kaohsiung (TW)

(73) Assignee: HUNG CHANG INTERNATIONAL ENERGY CO., LTD., Kaohsiung (TW)

( * ) Notice: Subject to any disclaimer, the term of this patent is extended or adjusted under 35 U.S.C. 154(b) by 294 days.

(21) Appl. No.: 17/109,885

(22) Filed: Dec. 2, 2020

(65) Prior Publication Data

US 2021/0167661 A1    Jun. 3, 2021

(30) Foreign Application Priority Data

Dec. 2, 2019   (TW) .................................. 108143997

(51) Int. Cl.
| | |
|---|---|
| *H02K 7/02* | (2006.01) |
| *H02S 10/20* | (2014.01) |
| *F16F 15/30* | (2006.01) |
| *H02K 7/116* | (2006.01) |
| *H02K 7/108* | (2006.01) |

(52) U.S. Cl.
CPC ............ *H02K 7/025* (2013.01); *F16F 15/30* (2013.01); *H02K 7/108* (2013.01); *H02K 7/116* (2013.01); *H02S 10/20* (2014.12); *Y02E 10/50* (2013.01); *Y02E 60/16* (2013.01); *Y02E 70/30* (2013.01)

(58) Field of Classification Search
CPC ..... Y02T 10/62; Y02T 10/70; Y02T 10/7072; B60K 6/387; B60K 1/02; B60K 16/00; B60K 2006/4808; B60K 6/442; B60K 6/448; B60K 2016/003; B60K 6/383; B60W 10/02; B60W 10/08; H02K 7/116; H02K 7/025; Y02E 60/16; Y02B 10/70
See application file for complete search history.

(56) References Cited

U.S. PATENT DOCUMENTS

| | | | |
|---|---|---|---|
| 9,108,633 B1 * | 8/2015 | Atluri | B60L 58/12 |
| 2010/0282530 A1 * | 11/2010 | Wang | B60K 6/442 |
| | | | 180/65.21 |
| 2016/0023653 A1 * | 1/2016 | Takahashi | B60K 17/06 |
| | | | 903/917 |

FOREIGN PATENT DOCUMENTS

| | | | | |
|---|---|---|---|---|
| CN | 202498995 U | | 10/2012 | |
| ES | 2608527 A1 * | | 4/2017 | ............ A01G 25/16 |
| JP | 2020156169 A * | | 9/2020 | |
| TW | M546995 U | | 8/2017 | |

* cited by examiner

*Primary Examiner* — Ryan Johnson
(74) *Attorney, Agent, or Firm* — Muncy, Geissler, Olds & Lowe, P.C.

(57) ABSTRACT

A system for providing dynamic force comprises a solar cell, an engine, a transmission module, two motors, two one-way fly wheels, and an electrical energy storage device. The solar cell is configured to drive the two motors. The transmission module comprises an input terminal and two output terminals. The input terminal of the transmission module is driven by the engine, and the output terminals of the transmission module are configured to drive the two motors respectively. The electrical energy storage device is configured to store electrical energy generated by the solar cell and drive the two motors. The two one-way fly wheels are driven by the two motors respectively.

10 Claims, 5 Drawing Sheets

SYSTEM AND METHOD FOR PROVIDING DYNAMIC FORCE

BACKGROUND OF THE INVENTION

1. Field of the Invention

The present invention relates to a system and a method for providing dynamic force, in particular to a system and a method for providing dynamic force with multiple terminals.

2. Description of the Prior Art

Needs for provision of dynamic force spreads across various industries. As a result, improving the quality of provision of dynamic force is crucially helpful to the promotion of industrial development. For example, to maintain the water quality of culture pond, aquaculturists have to conduct aeration to culture pond continuously and steadily. Hence arises the need for continuous and steady provision of dynamic force.

Moreover, as technology develops, aside from the improvement of efficiency, industries are now stepping gradually into the pursuit to be environmental. Accordingly, it is an important issue to integrate green energy into the provision of dynamic force.

SUMMARY OF THE INVENTION

The objective of the present invention is to provide a highly steady and flexible system for providing dynamic force utilizing green energy.

To achieve the objective described above, an aspect of the present invention relates to a system for providing dynamic force. According to one embodiment of the present invention, system for providing dynamic force may comprise a solar cell an engine, a transmission module, a plurality of motors, a plurality of one-way fly wheels, and an electrical energy storage device. The solar cell is configured to drive the plurality of motors. The transmission module comprises an input terminal and a plurality of output terminals, the input terminalis driven by the engine, and the plurality of output terminals drive the plurality of motors respectively. The electrical energy storage device is configured to store the electrical energy generated by the solar cell and drive the plurality of motors.

To achieve the objective described above, another aspect of the present invention relates to a system for providing dynamic force. According to one embodiment of the present invention, system for providing dynamic force may comprise a solar cell an engine, a transmission module, a plurality of motors, a plurality of ratchets, and an electrical energy storage device. The solar cell is configured to drive the plurality of motors. The transmission module comprises an input terminal and a plurality of output terminals, the input terminalis driven by the engine, and the plurality of output terminals drive the plurality of motors respectively. The electrical energy storage device is configured to store the electrical energy generated by the solar cell and drive the plurality of motors.

To achieve the objective described above, another aspect of the present invention relates to a method for providing dynamic force. According to an embodiment of the present invention, a method for providing dynamic force comprises the following steps. Storing, by at least one electrical energy storage device, electrical energy generated by at least one solar cell. Driving, by an engine and a transmission module, a plurality of motors in a low rotation period. Driving, by the at least one solar cell respectively, the plurality of motors in a high rotation period. Driving, by the at least one electrical energy storage device respectively, the plurality of motors in the high rotation period when the electrical energy generated by the at least one solar cell is not sufficient to drive the plurality of motors. Driving, by the plurality of motors, a plurality of one-way fly wheels.

BRIEF DESCRIPTION OF THE DRAWINGS

The following gives a brief description of the Figures.

DETAILED DESCRIPTION OF THE PREFERRED EMBODIMENT

Description of some embodiments of the present invention will be given below with reference to drawings. It should be noted that the illustration of the drawings are merely for the purpose of describing, and is not intended to limit the scope of the present invention.

In this disclosure, the term "coupled" may mean "directly coupled" or "indirectly coupled". "Coupled" may further refer to the interoperation or interaction between two or more elements.

Figure 1:
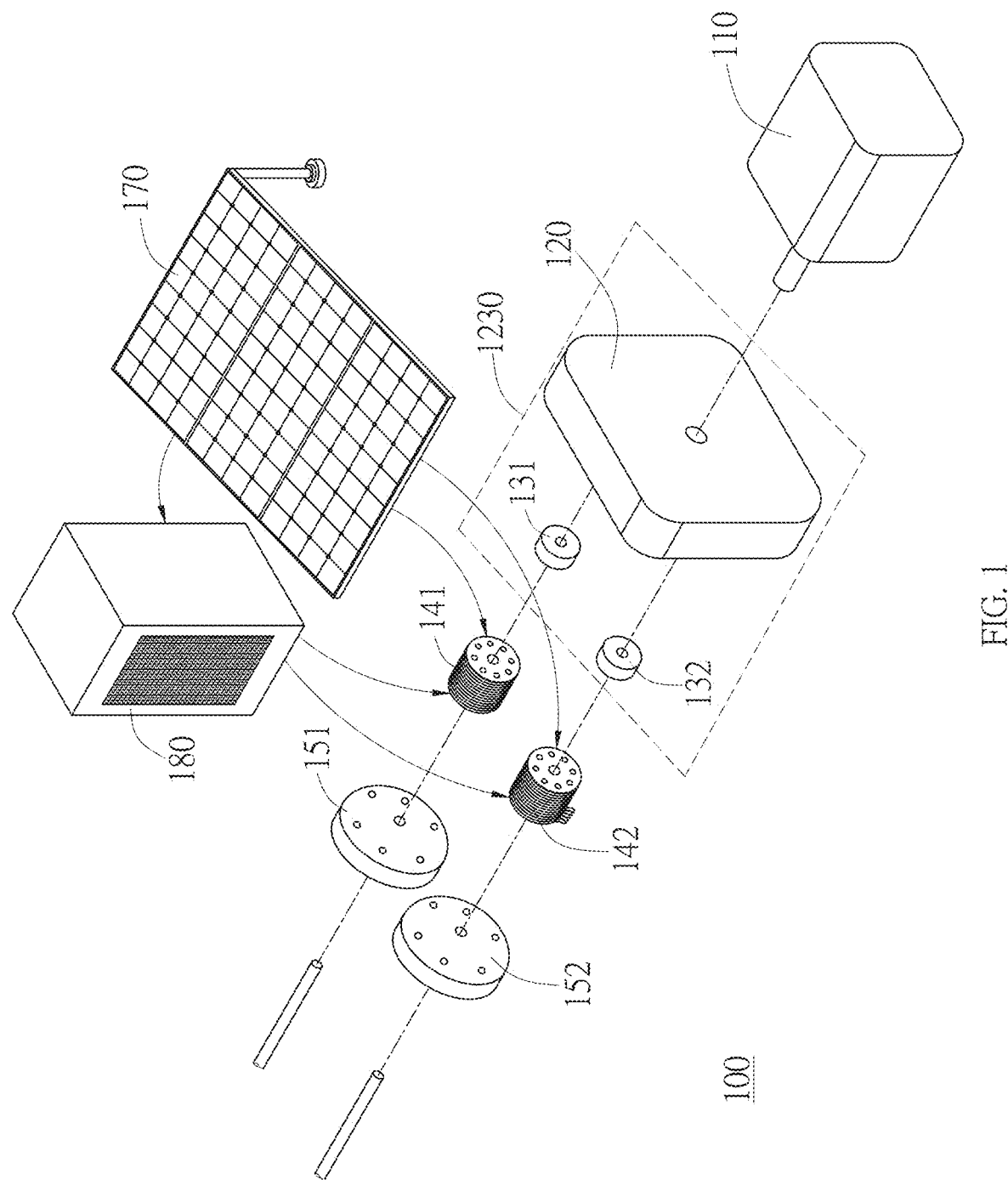
FIG. 1 illustrates a schematic view of an arrangement of a system for providing dynamic force of an embodiment of the present invention.

The arrangement of a system for providing dynamic force of an embodiment of the present invention is as shown in FIG. 1. Refer to FIG. 1, in one embodiment, the engine 110 operates as the source of dynamic force in the system for providing dynamic force 100. The dynamic force generated by the engine 110 is transmitted to first motor 141 and second motor 142 through gear box 120, first clutch 131, and second clutch 132, so as to drive the first motor 141 and the second motor 142. As shown in FIG. 1, the system for providing dynamic force 100 drives the first one-way fly wheel 151 and the second one-way fly wheel 152 by the first motor 141 and second motor 142, so as to provide dynamic force through the rotation of the first one-way fly wheel 151 and the second one-way fly wheel 152. In one embodiment, the engine 110 may be a diesel engine.

The description above is merely exemplary, and is not intended to limit the features of the present invention. For example, in this embodiment, the gear box 120, the first clutch 131 and the second clutch 132 compose a transmission module 1230 that can control the first motor 141 and the second motor 142 to be driven by the dynamic force of the engine 110, wherein the first clutch 131 and the second clutch 132 is disposed at a first output terminal and a second output terminal of the gear box 120 respectively. In other embodiments, a transmission module having an input terminal and a plurality of output terminals could be composed of other components. For example, in one embodiment, a transmission module may be composed of a flat belt drive mechanism and a plurality of clutches. In another embodiment, a transmission module may be composed of a chain drive mechanism and a plurality of clutches. In addition, the present invention is not limited to the arrangement of transmission module 1230 shown in FIG. 1. For example, in another embodiment, the first clutch 131 and the second clutch 132 may be disposed inside the gear box 120. It should be noted that in the embodiments described above, the transmission module 1230 comprises two output terminals, but the present invention is not limited thereto. In other embodiments, the transmission module may comprise any number of output terminals.

Figure 2:
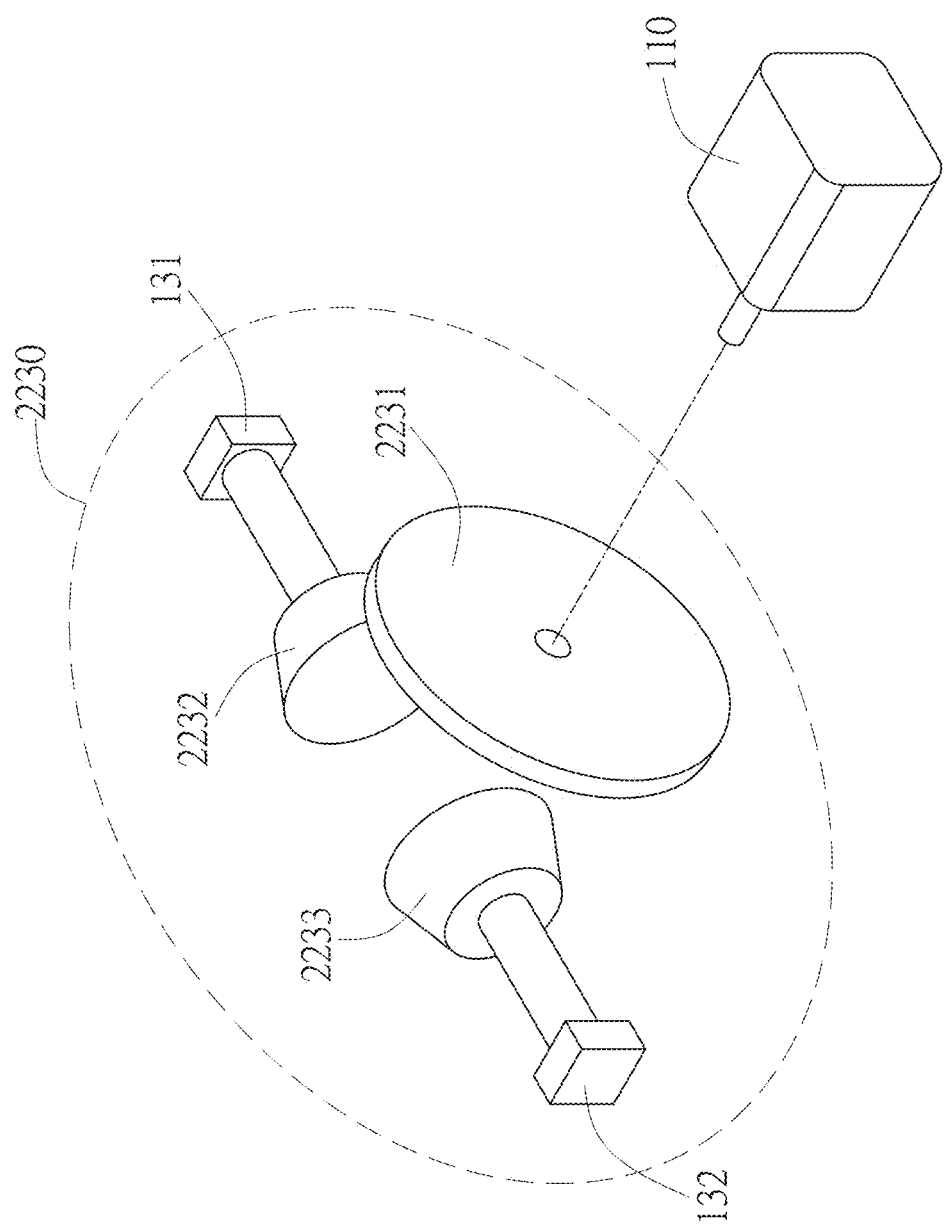
FIG. 2 illustrates a transmission module of an embodiment of the present invention.

Refer to FIG. 2, in another embodiment of the present invention, the transmission module 2230 may be composed of the bevel gear 2231, the bevel gear 2232, the clutch 131, the bevel gear 2233, and the clutch 132. As shown in FIG. 2, the transmission module 2330 has an input terminal (i.e. the shaft of the bevel gear 2331), a first output terminal (i.e. the shaft of bevel gear 2232) and a second output terminal (i.e. the shaft of the bevel gear 2233), the input terminal may be connected to the engine 110, the output terminals may be connected to two motors (not illustrated in FIG. 2), and the transmission module 2230 may control the output terminals to drive the motors respectively through clutch 131 and clutch 132.

In this embodiment, the gear box 120 has an input terminal and two output terminals, the input terminal of the transmission module 1230 is the input shaft of the gear box 120. The two output terminals of the transmission module 1230 are the two output terminals of the gear box 120. Moreover, in this embodiment, the transmission module 1230 comprises the first clutch 131 and the second clutch 132. Accordingly, the first clutch 131 and the second clutch 132 can be used to control the dynamic force generated by the output shaft of the gear box 120 to be transmitted to the first motor 141 and the second motor 142.

In this embodiment, due to the structure of one-way flywheel, when the rotational speed of the first motor 141 and the second motor 142 decreases or when the first motor 141 and the second motor 142 stop rotating, the first one-way fly wheel 151 and the second one-way fly wheel 152 may maintain their rotational inertia, so the reduction of the rotational speed of the first one-way fly wheel 151 and the second one-way fly wheel 152 is slower (in other words, compared with flywheels that can spin in two ways, the duration of one-way fly wheels in high rotational speed is longer). Accordingly, the efficiency of the provision of dynamic force may be improved. In another embodiment, the same effect may be achieved replacing one-way fly wheel with ratchet. As shown in FIG. 1, the system for providing dynamic force 100 also comprises the solar panel 170 and the electrical energy storage device 180. The arrows illustrated in FIG. 1 represent the power supply relationships between devices/components. In this embodiment, the solar panel 170 is electrically connected to the electrical energy storage device 180, the first motor 141, and the second motor 142. The electrical energy storage device 180 is electrically connected to the first motor 141 and the second motor 142. The electrical energy storage device 180 stores the electrical energy generated by the solar panel 170. The first motor 141 and the second motor 142 are not electrically connected to each other. The contents of the Figures are merely exemplary, so the dimensions and proportions of each of the components/elements may not necessarily match the actual dimensions and proportions.

In this embodiment, the first motor 141 and the second motor 142 may be respectively driven by the engine 110 and the transmission module 1230. The first motor 141 and the second motor 142 may also be respectively driven by the solar panel 170 and/or the electrical energy storage device 180. For example, in some scenarios, the engine 110 may rotate at a speed in the range of 150-250 rpm, and drive the first motor 141 and the second motor 142 to rotate at the same speed, and the rotational speed of first motor 141 and the second motor 142 may reach 850-1000 rpm when driven by the solar cell 170 or the electrical energy storage device 180. Accordingly, in these scenarios, the first motor 141 and the second motor 142 may be respectively driven by the engine 110 and the transmission module 1230 when there is no need for the first motor 141 and the second motor 142 to be rotating at a high rotational speed; while the first motor 141 and the second motor 142 may be respectively driven by the solar panel 170 or the electrical energy storage device 180 to increase the rotational speed of the first motor 141 and the second motor 142 when there is a need for the first motor 141 and the second motor 142 to be rotating at a high rotational speed. Moreover, in this embodiment, because the first motor 141 and the second motor 142 are driven respectively, various speeds may be provided for various needs. For example, the first motor 141 may be driven to rotate at a rotational speed of 850 rpm, while at the same time the second motor 142 may be driven to rotate at a rotational speed of 1000 rpm. The values of rotational speed are merely exemplary and is not intended to limit the present invention. In other scenarios, the first motor 141 and the second motor 142 may be driven to rotate at any rotational speed(s) of different or same value(s) to each other.

It should be noted that in this embodiment, the system for providing dynamic force 100 comprises a solar panel 170, but the present invention is not limited thereto, in other embodiments, the system for providing dynamic force 100 may comprise a plurality of solar panels.

The system for providing dynamic force 100 of this embodiment comprises a plurality of motors, so dynamic force may be provided flexibly. Moreover, the arrangement of a plurality of motors may increase the stability of provision of dynamic force, details will be described below.

Figure 3:
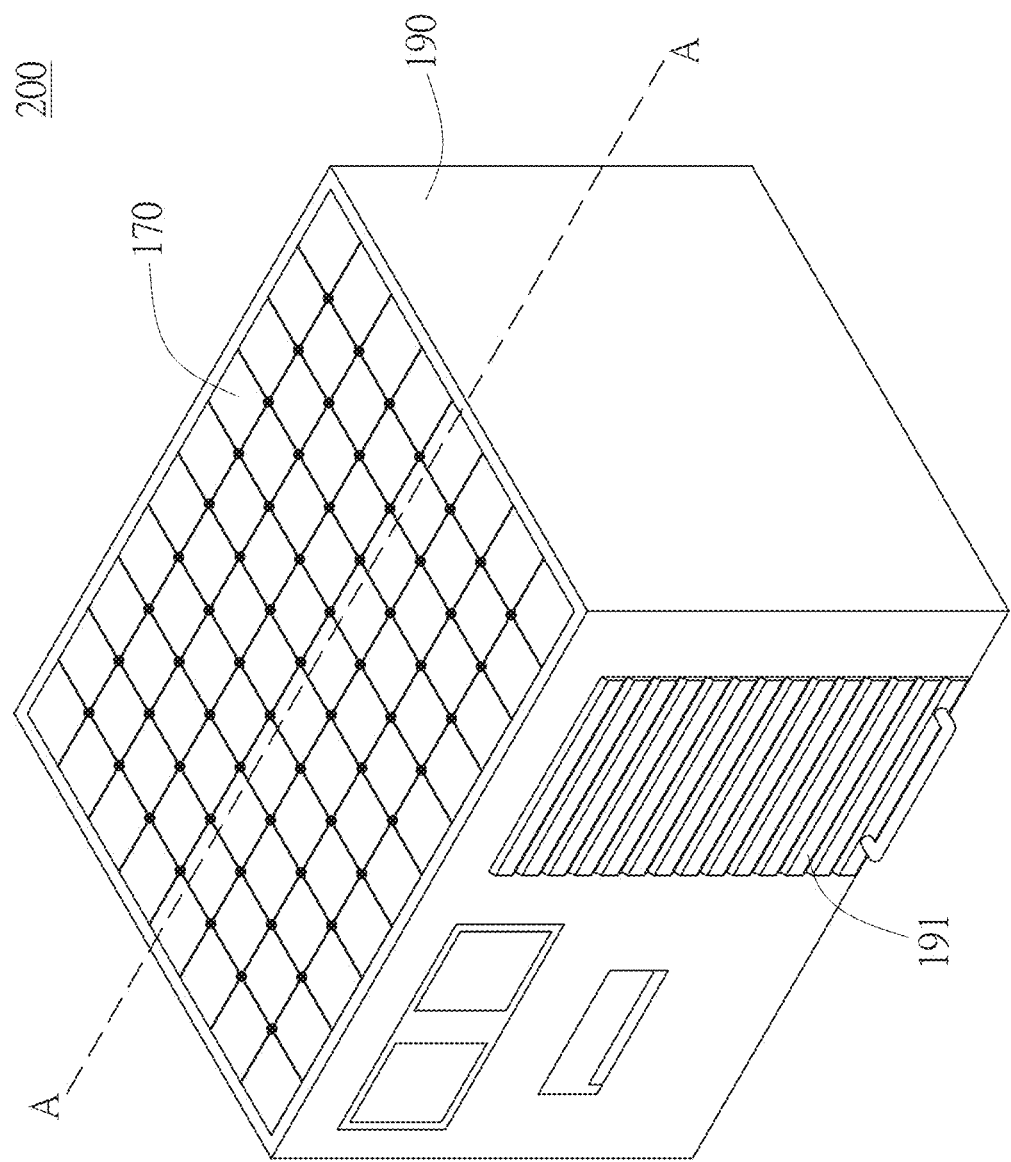
FIG. 3 illustrates a schematic view of an arrangement of a system for providing dynamic force of another embodiment of the present invention.

FIG. 3 illustrates the system for providing dynamic force 200 of another embodiment of the present invention. Refer to FIG. 3, in this embodiment, the solar panel 170 of the system for providing dynamic force 200 is disposed on top of the sound insulation container 190, other devices/components of the system for providing dynamic force 200 are disposed inside the sound insulation container 190. As shown in FIG. 3, the sound insulation container 190 comprise a roll-up door 191 to provide convenient access to the system for providing dynamic force 200.

Figure 4:
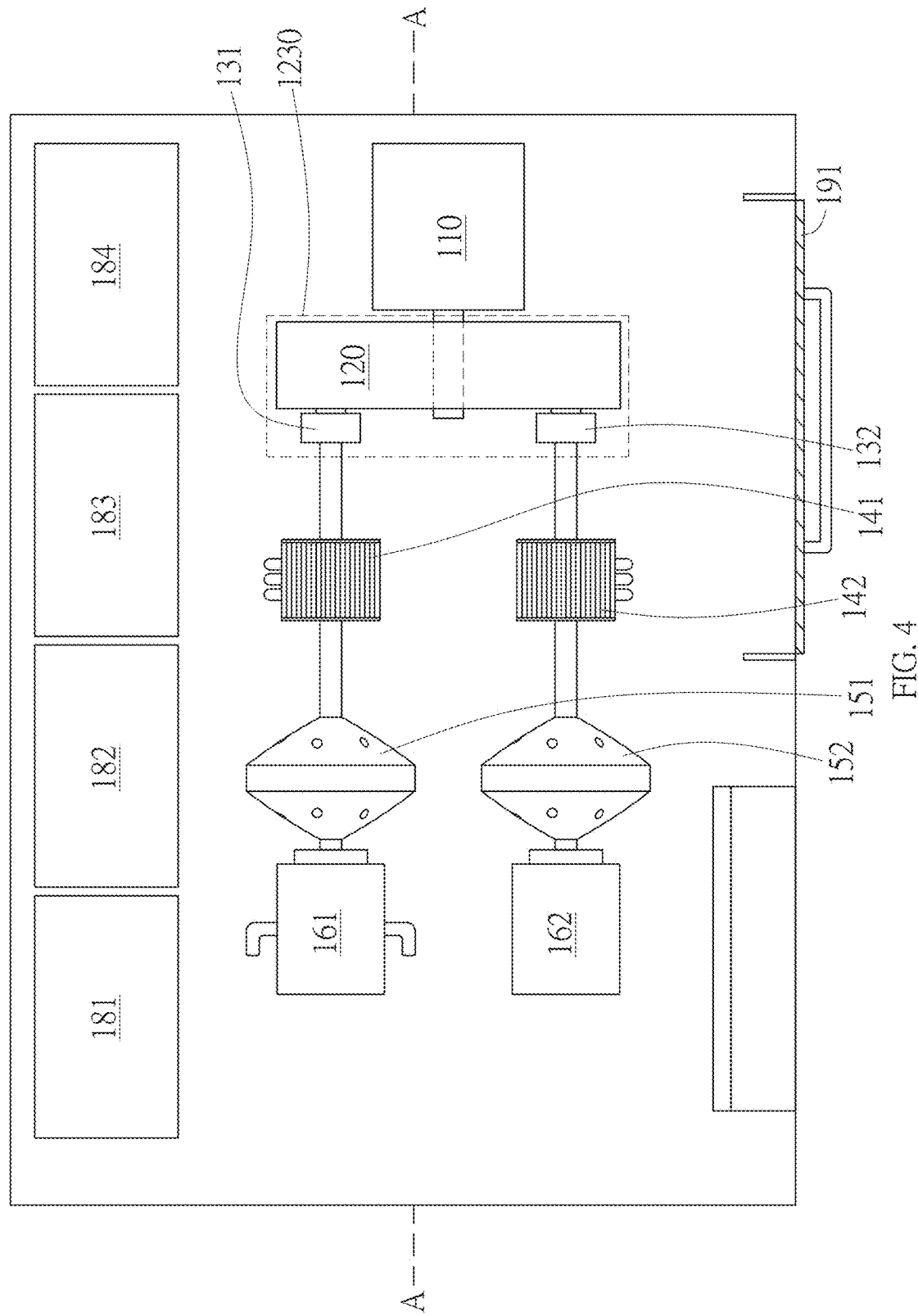
FIG. 4 illustrates a cross-sectional view taken along line A-A of FIG. 3.

FIG. 4 illustrates a cross-sectional view taken along line A-A of FIG. 3. Refer to FIG. 4, in this embodiment, the arrangement of the system for providing dynamic force 200 is substantially the same as the arrangement of the system for providing dynamic force 100 illustrated in FIG. 1, but the system for providing dynamic force 200 of this embodiment comprises four electrical energy storage devices 181-184. Moreover, the first one-way fly wheel 151 drives the pump 161, and the second one-way fly wheel 152 drives the generator 162.

The description above is merely exemplary and is not intended to limit the scope of the present invention. For example, in other embodiments, the system for providing dynamic force of the present invention may drive two pumps or two generators. Or, depending on the needs, the system for providing dynamic force of the present invention may comprise a larger number of terminals (e.g. the gear box 120 may comprise a larger number of output shafts) to drive more motors and in turn drive more pumps or generators. For example, in some embodiments the system for providing dynamic force may comprise a terminal that drives a pump for aeration, a terminal that drives another pump for fire fighting, and one or more terminals that drive one or more generators. Moreover, in other embodiments, the system for providing dynamic force of the present invention may comprise different numbers of electrical energy storage devices.

Refer to FIG. 3 and FIG. 4, in this embodiment, aside from storing electrical energy generated by the solar panel 170, the electrical energy storage devices 181-184 may also store electrical energy generated by the generator 162 (the power supply relationships between the devices/components are not illustrated for the sake of conciseness). For example, in one scenario, the engine 110 may be operated to rotate at 150 rpm to drive the first one-way fly wheel 151 to provide dynamic force to the pump 161, and drive the second one-way fly wheel 152 to provide dynamic force to the generator 162. Electrical energy generated by the generator 162 and the solar panel 170 may be stored in the electrical energy storage devices 181-184. When larger dynamic force is needed, the axes of the first motor 141 and the second motor 142 may be disconnected from output shaft(s) of the gear box 120, and the first motor 141 and/or second motor 142 may be driven by the solar panel 170 and/or the electrical energy storage devices 181-184 instead to increase the rotational speed of the first motor 141 and/or the second motor 142 to 850-1000 rpm. In some embodiments where the first motor 141 and the second motor 142 are motors with one-way bearing, the first motor 141 and/or the second motor 142 need not to be disconnected from output shaft(s) of the gear box 120 by the first clutch 131 and the second clutch 132 when the first motor 141 and/or the second motor 142 is driven by the solar panel 170 and/or the electrical energy storage devices 181-184. When there is no need for the first motor 141 and/or the second motor 142 to rotate at high rotational speed, the first motor 141 and/or the second motor 142 may stop being driven by electrical energy of the solar panel 170 and/or the electrical energy storage devices 181-184, and the first motor 141 and/or the second motor 142 may be connected to output shaft(s) of the gear box 120 by the first clutch 131 and/or the second clutch 132, so the rotational speed of the first motor 141 and/or the second motor 142 may fall back to 150 rpm. During the fall of the rotational speed, the first one-way fly wheel 151 and the second one-way fly wheel 152 will lose speed at a lower rate than the first motor 141 and the second motor 142. Accordingly, during the fall of the rotational speed, the second one-way fly wheel 152 may keep driving the generator 162 at rotational speed higher than 150 rpm to generate electrical energy for the electrical energy storage devices 181-184 to store.

As described above, in this embodiment, dynamic force may be flexibly provided by each of the motors. For example, the system for providing dynamic force 200 may be used in aeration of culture pond. During regular times of aeration, the first motor 141 and the second motor 142 may be driven by the engine 110 through the transmission module 1230, so as to drive the pump 161 to aerate a culture pond and drive the generator 162 to generate electrical energy for the electrical energy storage devices 181-184 to store. When there is need for the first motor 141 to rotate at a high rotational speed (e.g. when there is a need for fire fighting, the pump 161 may be used to provide water jets for fire fighting), the axis of the first motor 141 may be disconnected from a output shaft of the gear box 120 by the first clutch 131, and the first motor 141 may instead be driven by the solar panel 170 and/or the electrical energy storage devices 181-184, so as to increase the rotational speed of the first motor 141. At the same time, the second motor 142 may still be driven by the engine 110 through the transmission module 1230 and keep driving the generator 162 to generate electrical power. Since the first motor 141 and the second motor 142 may rotate at different rotational speeds, the system for providing dynamic force of the present invention may satisfy different needs for dynamic force at one time. It should be noted that the needs given above are merely exemplary and are not intended to limit applications of the present invention. In another embodiment, the first motor 141 and the second motor 142 may drive two pumps respectively. With this arrangement, when there is a need for fire fighting and electrical energies of the solar panel 170 and the electrical energy storage devices 181-184 are not sufficient to drive the first motor 141 and the second motor 142, the rotational speed of the engine may be increased, and the waterpipes of the two pumps may be connected to provide the amount of water required by a water jet.

In some embodiments, two one-way fly wheels of the system for providing dynamic force may be used to drive two pumps so as to contribute to stability of the provision of dynamic force. For example, if the system for providing dynamic force of these embodiments is applied in aeration of aquaculture pond, when one of the two pumps fails and requires maintenance or replacement, the other pump may remain in operation, so the aeration would not break off. Hence the stability and anti-risk capability of the system for providing dynamic force of the present invention. In these embodiments, during the replacement of the failed pump, and the axis of the failed motor may be disconnected from an output terminal of the gear box, and the engine may remain in operation, so the other motor may also remain in operation. Accordingly, maintenance of these embodiments is nimble.

Figure 5:
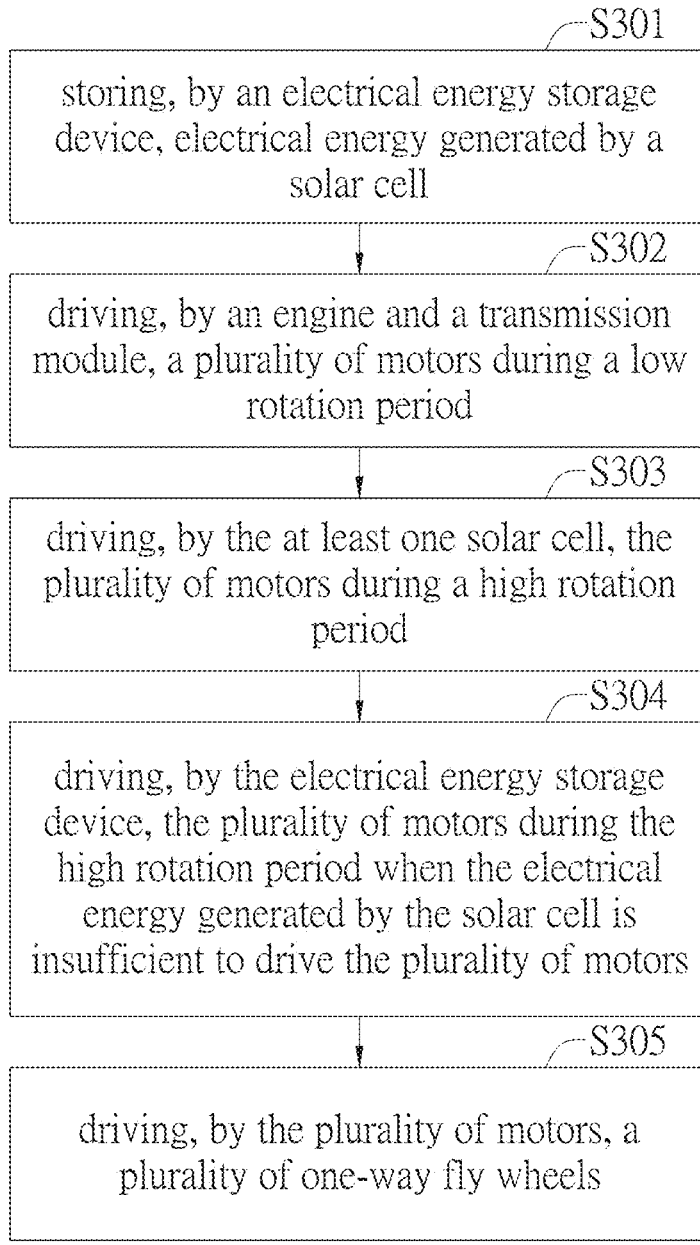
FIG. 5 illustrates a flowchart of a method for providing dynamic force of an embodiment of the present invention.

FIG. 5 illustrates the flow chart of a method for providing dynamic force of one embodiment of the present invention. Refer to FIGS. 3-5, in one embodiment, the method for providing dynamic force 300 shown in FIG. 5 may be carried out by the system for providing dynamic force 200 shown in FIGS. 3-4.

In step S201, electrical energy generated by the solar panel 170 may be stored by the electrical energy storage devices 181-184. In step S202, in a low rotation period where the need for dynamic force is low, the first motor 141 and the second motor 142 may be driven by the engine 110 through the transmission module 1230. In step S203, in a high rotation period where the need for dynamic force is high, the first motor 141 and the second motor 142 may be driven by the solar panel 170. In step S204, in the high rotation period, when the electrical energy generated by the solar panel 170 is not sufficient to drive the first motor 141 and the second motor 142, the first motor 141 and the second motor 142 may be respectively driven by electrical energy generated by electrical energy storage devices 181-184. In step S205, the first one-way fly wheel 151 and the second one-way fly wheel 152 may be respectively driven by the first motor 141 and the second motor 142, so as to provide dynamic force with the first one-way fly wheel 151 and the second one-way fly wheel 152.

It should be noted that the steps described above are merely exemplary. In other embodiments, the order of the steps may be altered. The method for providing dynamic force of the present invention is not limited to the order of steps described above.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A system for providing dynamic force, comprising:
   at least one solar cell;
   at least one electrical energy storage device configured to store electrical energy generated by the at least one solar cell;
   an engine;
   a transmission module driven by the engine, the transmission module comprises an input terminal, a first output terminal, a second output terminal, a first clutch, and a second clutch;
   a first motor driven by at least one of the first output terminal, the at least one solar cell, and the at least one electrical energy storage device;
   a second motor driven by at least one of the second output terminal, the at least one solar cell, and the at least one electrical energy storage device;
   a first one-way fly wheel driven by the first motor; and
   a second one-way fly wheel driven by the second motor;
   wherein the first clutch is disposed at the first output terminal, the second clutch is disposed at the second output terminal, and the transmission module is configured to control, through the first clutch and the second clutch, the first output terminal and the second output terminal to drive the first motor and the second motor, respectively.

2. The system for providing dynamic force of claim 1, wherein the transmission module comprises a gear box, the input terminal of the transmission module is an input shaft of the gear box, and the first output terminal and the second output terminal are two output shafts of the gear box, respectively.

3. The system for providing dynamic force of claim 1, wherein the transmission module comprises a plurality of bevel gears, and the input terminal, the first output terminal, and the second output terminal are shafts of three of the plurality of bevel gears, respectively.

4. The system for providing dynamic force of claim 1, further comprising:
   a pump driven by one of the first one-way fly wheel and the second one-way fly wheel.

5. The system for providing dynamic force of claim 1, further comprising:
   a generator driven by one of the first one-way fly wheel and the second one-way fly wheel, wherein the at least one electrical energy storage device is further configured to store electrical energy generated by the generator.

6. The system for providing dynamic force of claim 1, further comprising:
   a sound insulation container, wherein the at least one solar cell is disposed on top of the sound insulation container, and the engine, the transmission module, the motor, the first one-way fly wheel, the second one-way fly wheel, and the least one electrical energy storage device are disposed in the sound insulation container.

7. A system for providing dynamic force, comprising:
   at least one solar cell;
   at least one electrical energy storage device configured to store electrical energy generated by the at least one solar cell;
   an engine;
   a transmission module driven by the engine, the transmission module comprising an input terminal, a first output terminal, a second output terminal, a first clutch, and a second clutch;
   a first motor driven by at least one of the first output terminal, the at least one solar cell, and the at least one electrical energy storage device;
   a second motor driven by at least one of the second output terminal, the at least one solar cell, and the at least one electrical energy storage device;
   a first ratchet driven by the first motor; and
   a second ratchet driven by the second motor;
   wherein the transmission module is configured to control, through the first clutch and the second clutch, the first output terminal and the second output terminal to drive the first motor and the second motor, respectively.

8. A method for providing dynamic force, comprising:
   storing, by at least one electrical energy storage device, electrical energy generated by at least one solar cell;
   driving, by an engine and a transmission module, a plurality of motors during a low rotation period;
   driving, by the at least one solar cell, the plurality of motors during a high rotation period;
   driving, by the at least one electrical energy storage device, the plurality of motors during the high rotation period when the electrical energy generated by the at least one solar cell is insufficient to drive the plurality of motors; and
   driving, by the plurality of motors, a plurality of one-way fly wheels.

9. The method for providing dynamic force of claim 8, wherein the plurality of one-way fly wheels drive a plurality of pumps, respectively, and the transmission module comprises a plurality of clutches configured to control the plurality of motors to be driven by the engine, and wherein the method further comprises:
   stopping, by the plurality of clutches, driving the plurality of motors by the dynamic force of the engine during the high rotation period;
   when one of the plurality of pumps fails, stopping, by one of the plurality of clutches, driving one of the plurality of motors that is connected to the failed pump.

10. The method for providing dynamic force of claim 8, wherein one of the one-way fly wheels drives a generator, and the method further comprises:
    storing, by the at least one electrical energy storage device, electrical energy generated by the generator.

* * * * *